United States Patent
Kim et al.

(10) Patent No.: US 8,234,493 B2
(45) Date of Patent: Jul. 31, 2012

(54) METHOD FOR TRANSMITTING CONTENT IN HOME NETWORK USING USER-BINDING

(75) Inventors: Myung-sun Kim, Uiwang-si (KR); Sung-hyu Han, Seoul (KR); Yong-kuk You, Seoul (KR); Young-sun Yoon, Suwon-si (KR); Bong-seon Kim, Seongnam-si (KR); Jae-heung Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1343 days.

(21) Appl. No.: 11/280,453

(22) Filed: Nov. 17, 2005

(65) Prior Publication Data

US 2006/0129818 A1 Jun. 15, 2006

Related U.S. Application Data (60) Provisional application No. 60/628,386, filed on Nov. 17, 2004.

(30) Foreign Application Priority Data

Nov. 30, 2004 (KR) ........................ 10-2004-0099434

(51) Int. Cl.
 *H04L 29/06* (2006.01)
(52) U.S. Cl. .............. 713/171; 726/26; 726/27; 726/28; 726/29
(58) Field of Classification Search .............. 726/26–29; 713/171
 See application file for complete search history.

(56) References Cited

U.S. PATENT DOCUMENTS

| | | | | |
|---|---|---|---|---|
| 4,503,287 A | * | 3/1985 | Morris et al. | 380/45 |
| 4,578,531 A | * | 3/1986 | Everhart et al. | 380/282 |
| 5,629,980 A | * | 5/1997 | Stefik et al. | 705/54 |
| 5,809,140 A | * | 9/1998 | Rubin et al. | 380/279 |
| 5,812,664 A | * | 9/1998 | Bernobich et al. | 380/278 |
| 5,940,512 A | * | 8/1999 | Tomoike | 380/248 |
| 6,192,130 B1 | * | 2/2001 | Otway | 380/277 |

(Continued)

FOREIGN PATENT DOCUMENTS

JP 2000-113587 A 4/2000

(Continued)

OTHER PUBLICATIONS

Bruce Schneier; Applied Cryptography; 1996; p. 31-40.*

(Continued)

*Primary Examiner* — Edan Orgad
*Assistant Examiner* — James Turchen
(74) *Attorney, Agent, or Firm* — Sughrue Mion, PLLC (57) ABSTRACT

A method for transmitting content to a user device from a home server in a home network is provided. The method includes: receiving an allocated user public key and a user private key of a user to whom the home server belongs; generating an arbitrary session public key and a session private key, generating an encrypted session private key by encrypting the session private key using a device public key that is a public key of the user device, and transmitting the encrypted session private key to the user device; and transmitting the content encrypted using a predetermined content key and a content key encrypted using the session private key to the user device. According to the method, by binding the content to each user, instead of to each device, the content can be safely and conveniently shared.

23 Claims, 7 Drawing Sheets

U.S. PATENT DOCUMENTS

| | | | |
|---|---|---|---|
| 6,345,256 B1* | 2/2002 | Milsted et al. | 705/64 |
| 6,463,534 B1* | 10/2002 | Geiger et al. | 713/168 |
| 6,487,660 B1* | 11/2002 | Vanstone et al. | 713/168 |
| 6,513,117 B2* | 1/2003 | Tarpenning et al. | 713/156 |
| 6,522,607 B1 | 2/2003 | Ishibashi et al. | |
| 6,550,011 B1* | 4/2003 | Sims, III | 713/193 |
| 6,636,968 B1* | 10/2003 | Rosner et al. | 713/178 |
| 6,636,969 B1* | 10/2003 | Jakobsson et al. | 713/180 |
| 6,684,331 B1* | 1/2004 | Srivastava | 713/163 |
| 6,711,264 B1* | 3/2004 | Matsumoto et al. | 380/283 |
| 6,728,379 B1* | 4/2004 | Ishibashi et al. | 380/278 |
| 6,741,705 B1* | 5/2004 | Nelson et al. | 380/257 |
| 6,782,100 B1* | 8/2004 | Vanstone et al. | 380/28 |
| 6,813,501 B2* | 11/2004 | Kinnunen et al. | 455/456.2 |
| 6,904,522 B1* | 6/2005 | Benardeau et al. | 713/156 |
| 6,990,684 B2* | 1/2006 | Futamura et al. | 726/18 |
| 6,993,137 B2* | 1/2006 | Fransdonk | 380/279 |
| 7,062,045 B2* | 6/2006 | Riddick et al. | 380/44 |
| 7,096,359 B2* | 8/2006 | Agrawal et al. | 713/168 |
| 7,099,479 B1* | 8/2006 | Ishibashi et al. | 380/281 |
| 7,146,009 B2* | 12/2006 | Andivahis et al. | 380/277 |
| 7,181,017 B1* | 2/2007 | Nagel et al. | 380/282 |
| 7,185,195 B2* | 2/2007 | Hug et al. | 713/156 |
| 7,194,091 B2* | 3/2007 | Higashi et al. | 380/202 |
| 7,203,312 B1* | 4/2007 | Hatanaka et al. | 380/201 |
| 7,203,966 B2* | 4/2007 | Abburi et al. | 726/29 |
| 7,209,893 B2* | 4/2007 | Nii | 705/26.81 |
| 7,278,165 B2* | 10/2007 | Molaro | 726/27 |
| 7,296,147 B2 | 11/2007 | Matsuzaki et al. | |
| 7,310,732 B2* | 12/2007 | Matsuyama et al. | 713/176 |
| 7,318,236 B2* | 1/2008 | DeMello et al. | 726/26 |
| 7,330,969 B2* | 2/2008 | Harrison et al. | 713/155 |
| 7,340,769 B2* | 3/2008 | Baugher | 726/5 |
| 7,353,383 B2* | 4/2008 | Skingle | 713/156 |
| 7,353,541 B1* | 4/2008 | Ishibashi et al. | 726/26 |
| 7,356,144 B2 | 4/2008 | Nishimoto et al. | |
| 7,389,273 B2* | 6/2008 | Irwin et al. | 705/59 |
| 7,389,412 B2* | 6/2008 | Sharma et al. | 713/153 |
| 7,424,115 B2* | 9/2008 | Hyyppa et al. | 380/44 |
| 7,426,750 B2* | 9/2008 | Cooper et al. | 726/26 |
| 7,437,771 B2* | 10/2008 | Alkove et al. | 726/29 |
| 7,441,117 B2 | 10/2008 | Matsuzaki et al. | |
| 7,483,942 B2* | 1/2009 | Nakayama et al. | 709/203 |
| 7,487,363 B2* | 2/2009 | Alve et al. | 713/193 |
| 7,509,685 B2* | 3/2009 | Lambert | 726/27 |
| 7,523,211 B2* | 4/2009 | Takabayashi et al. | 709/229 |
| 7,523,310 B2* | 4/2009 | Narin et al. | 713/172 |
| 7,549,172 B2* | 6/2009 | Tokutani et al. | 726/27 |
| 7,564,345 B2* | 7/2009 | Devadas et al. | 340/539.1 |
| 7,774,597 B2* | 8/2010 | Narayanan | 713/163 |
| 2002/0077988 A1* | 6/2002 | Sasaki et al. | 705/59 |
| 2002/0157002 A1* | 10/2002 | Messerges et al. | 713/155 |
| 2003/0108206 A1 | 6/2003 | Diehl et al. | |
| 2004/0059937 A1* | 3/2004 | Nakano | 713/200 |
| 2004/0059939 A1 | 3/2004 | De Jong | |
| 2004/0103312 A1* | 5/2004 | Messerges et al. | 713/201 |
| 2004/0117650 A1* | 6/2004 | Karaoguz et al. | 713/200 |
| 2004/0117836 A1* | 6/2004 | Karaoguz et al. | 725/81 |
| 2004/0133794 A1* | 7/2004 | Kocher et al. | 713/193 |
| 2004/0133908 A1 | 7/2004 | Smith et al. | |
| 2004/0158712 A1* | 8/2004 | Lee et al. | 713/165 |
| 2004/0172533 A1* | 9/2004 | DeMello et al. | 713/164 |
| 2004/0193919 A1* | 9/2004 | Dabbish et al. | 713/201 |
| 2004/0249815 A1* | 12/2004 | Lee | 707/9 |
| 2005/0025316 A1* | 2/2005 | Pelly et al. | 380/277 |
| 2005/0027991 A1* | 2/2005 | DiFonzo | 713/185 |
| 2005/0071279 A1* | 3/2005 | Asano | 705/57 |
| 2005/0091173 A1* | 4/2005 | Alve | 705/71 |
| 2005/0102513 A1* | 5/2005 | Alve | 713/168 |
| 2005/0210395 A1* | 9/2005 | Wakita et al. | 715/753 |
| 2005/0216724 A1* | 9/2005 | Isozaki et al. | 713/150 |
| 2005/0216747 A1* | 9/2005 | Yeap et al. | 713/185 |
| 2005/0246763 A1* | 11/2005 | Corcoran et al. | 726/3 |
| 2006/0106836 A1* | 5/2006 | Masugi et al. | 707/101 |
| 2006/0143295 A1* | 6/2006 | Costa-Requena et al. | 709/227 |
| 2007/0030974 A1 | 2/2007 | Ishibashi et al. | |
| 2007/0064675 A1* | 3/2007 | Szucs | 370/352 |
| 2007/0079381 A1* | 4/2007 | Hartung et al. | 726/26 |
| 2007/0088660 A1* | 4/2007 | Abu-Amara | 705/57 |
| 2008/0133918 A1* | 6/2008 | You et al. | 713/175 |

FOREIGN PATENT DOCUMENTS

| | | |
|---|---|---|
| JP | 2001-69134 A | 3/2001 |
| JP | 2002-9763 A | 1/2002 |
| JP | 200277143 A | 3/2002 |
| JP | 2002-290395 A | 10/2002 |
| JP | 20038566 A | 1/2003 |
| JP | 2003-134099 A | 5/2003 |
| JP | 2003-152698 A | 5/2003 |
| JP | 2003-174441 A | 6/2003 |
| JP | 2003-209827 A | 7/2003 |
| JP | 2003-289296 A | 10/2003 |
| JP | 2004-72721 A | 3/2004 |
| JP | 2004-120736 A | 4/2004 |
| JP | 2004259280 | 9/2004 |
| JP | 2004-303111 A | 10/2004 |
| KR | 10-2001-0019717 A | 3/2001 |
| KR | 10-2002-0042083 A | 6/2002 |
| KR | 2003-0001482 A | 1/2003 |

OTHER PUBLICATIONS

Popescu et al., A DRM Security Architecture for Home Networks; DRM 04; Oct. 25, 2004; ACM.*

Menezes et al.; Handbook of Applied Cryptography; CRC press; Dec. 16, 1996.*

Office Action dated May 31, 2011 from the Japanese Patent Office in counterpart Japanese application No. 2007-542891.

Communication dated Feb. 21, 2012 from the Japanese Patent Office in counterpart Japanese application No. 2007-524891.

* cited by examiner

METHOD FOR TRANSMITTING CONTENT IN HOME NETWORK USING USER-BINDING

This application the claims priority from U.S. Provisional Application No. 60/628,386, filed on Nov. 17, 2004, in the U.S. Patent and Trademark Office and from Korean Patent Application No. 10-2004-0099434, filed on Nov. 30, 2004, in the Korean Intellectual Property Office, the disclosures of which are incorporated herein in their entireties by reference.

BACKGROUND OF THE INVENTION

1. Field of the Invention

The present invention relates to a content transmission method, and more particularly, to a content transmission method enabling user devices in a home network to share content more conveniently and safely.

2. Description of the Related Art

Digital content is transmitted to a user by a content provider. The content should be protected such that only after the user obtains a proper right by paying a fee for the content, the user can use the digital content and if the proper right is not obtained, the user cannot use the content.

In order to prevent an unauthorized user from obtaining the content, the content should be encrypted with a content key and the content key should be distributed only to an authorized user.

Meanwhile, with the latest development of home network technologies, one user can own more than one user device, and also, the movement of content between devices becomes possible. Sometimes, a user wants to use content in all devices owned by the user, with one payment. However, if the content can be moved freely in a reproducible way between devices, an unauthorized user can obtain and use the content. Accordingly, in home networking, a technology which permits a movement of content between user devices in a home network of an authorized user while preventing an unauthorized user from obtaining the content or using the content even if the content obtained, is needed.

In particular, Federal Communications Commission (FCC) of the U.S. requires from July 2005, a technology by which a 1-bit broadcast flag (BF) should be inserted into a high density (HD) level content broadcast through digital broadcasting in the U.S. so that if the BF of the content is 1, the content can be protected such that an unauthorized user cannot use the content.

Figure 1:
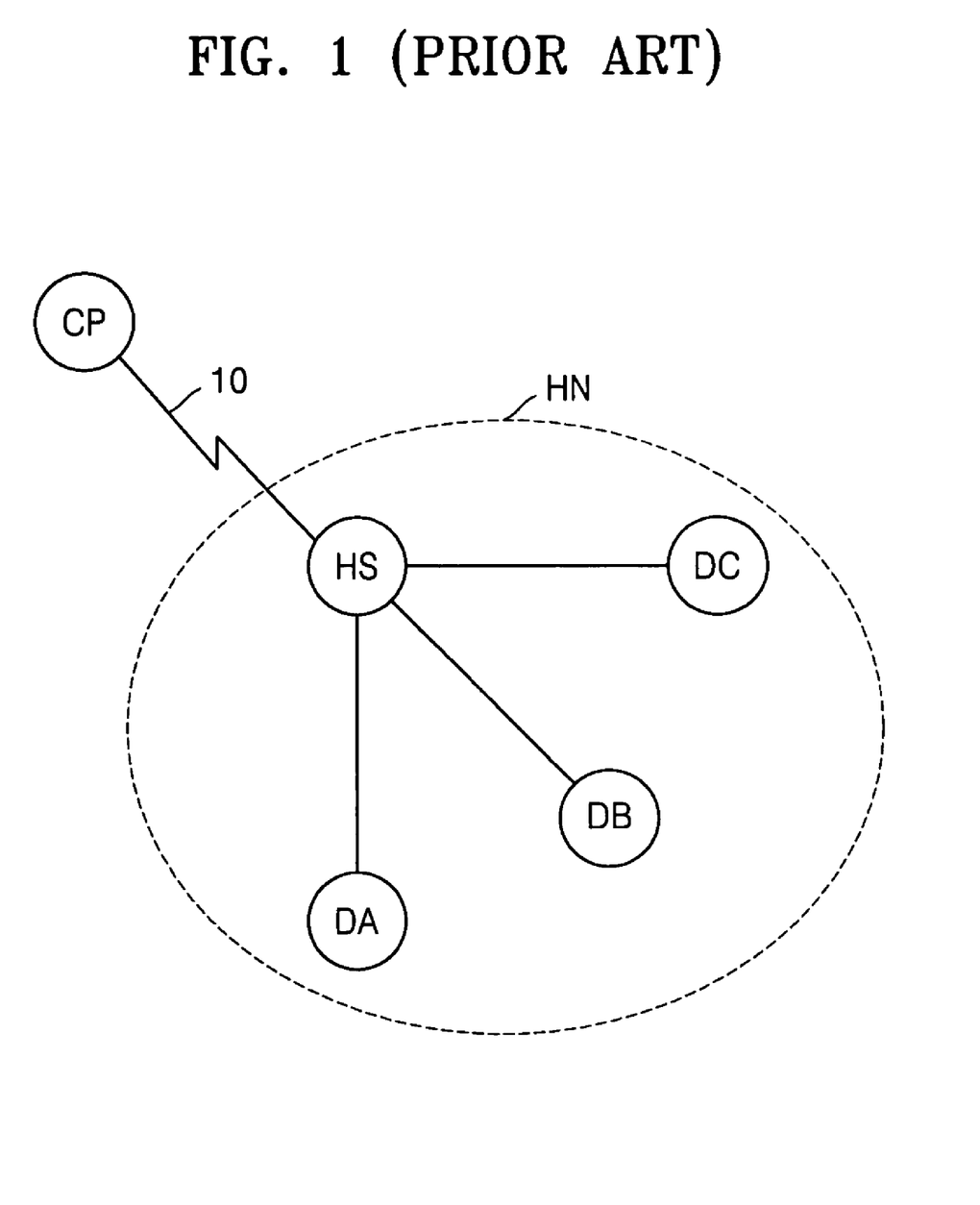
FIG. 1 is a diagram showing the structure of a home network.

FIG. 1 is a diagram showing the structure of a home network.

A content provider CP transmits content to a home server HS through a transmission channel 10.

The home server HS is connected to user devices DA, DB, and DC, and manages joining and secession of an authorized user device, and transmits the content only to an authorized user device, that is, a device currently registered.

Here, a domain refers to a set of user devices connected to one home server. The devices in a domain will vary due to user devices joining or leaving the home network. Accordingly, a process for preventing a user device that has left and is no longer registered with the home network from obtaining content is needed.

Content is encrypted by using a content key and the content key is encrypted by using a common key, and the content and the content key are transmitted to each of the user devices DA, DB, and DC. The common key can be obtained only by a user device that is currently registered in the home network.

Figure 2:
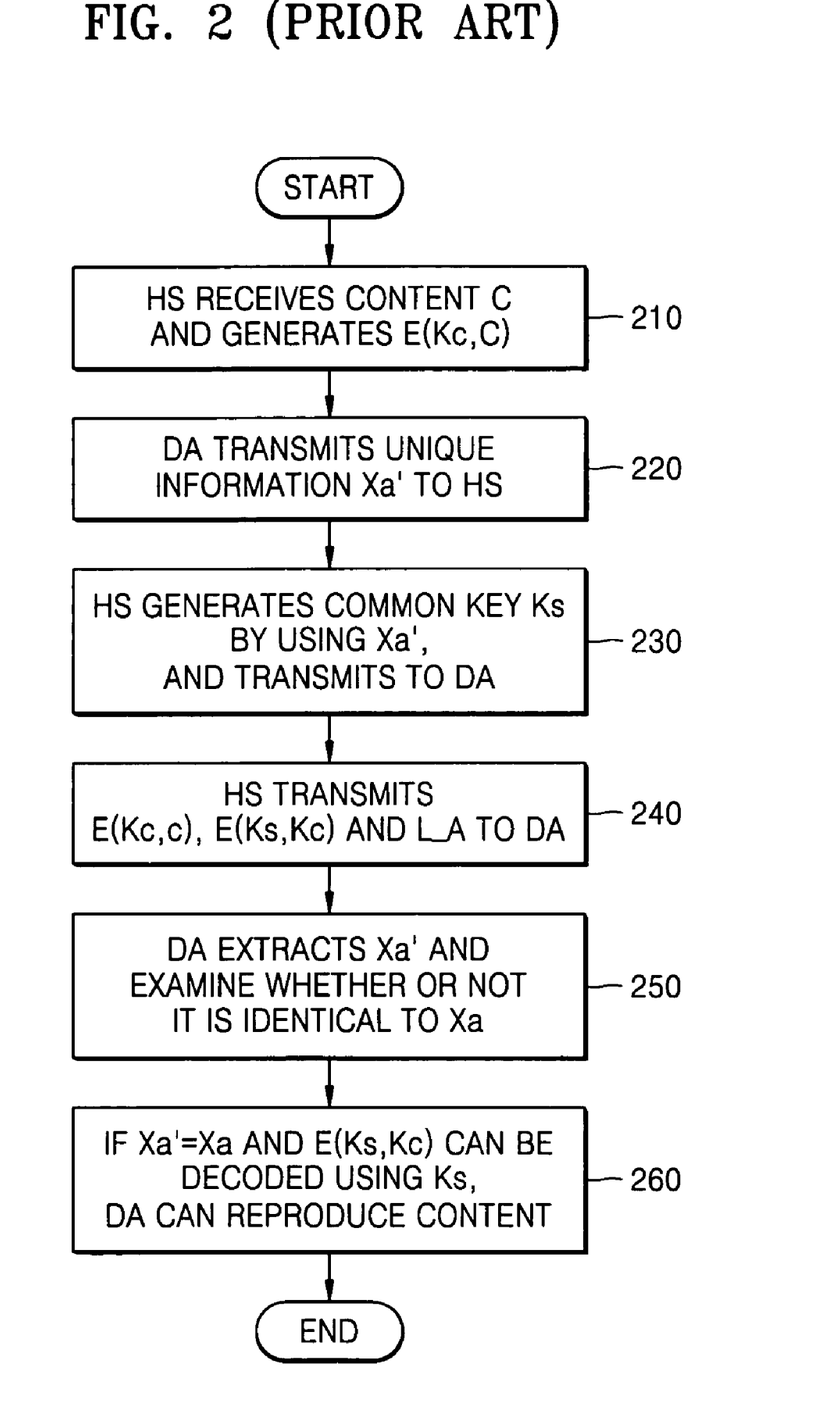
FIG. 2 is a flowchart of the operations performed by the conventional method for transmitting content.

FIG. 2 is a flowchart of the operations performed by the conventional method for transmitting content.

In operation 210, the home server HS receives content C from the transmission channel 10, and by encrypting the content C using a content key Kc, the home server HS generates an encrypted content E(Kc, C). The transmission channel 10 can be any of a variety of channels, such as the Internet, ground wave, and satellite broadcasting.

In operation 220, the user device DA transmits its unique information Xa' to the home server HS.

In operation 230, the home server HS generates a common key Ks by using the unique information Xa', and then transmits it to the user device DA.

In operation 240, the home server HS transmits the encrypted content E(Kc, C), an encrypted content key E(Ks, Kc), and a license L_A to user device DA.

The license L_A includes usage rule UR on the content C and the unique information Xa' of the user device DA.

In operation 250, the user device DA extracts the unique information Xa' from the license L_A received in operation 240, and then compares this with DA's own unique information Xa.

In operation 260, the user device DA determines if Xa'=Xa and whether or not it is possible to generate the content key Kc by decoding the encrypted content key E(Ks, Kc) received in operation 240 by using the common key Ks received in operation 230. If these two conditions are met, the user device DA in operation 220 is the same as the user device DA in operation 240, and therefore the user device DA can reproduce the content C.

However, the conventional method has the following drawbacks.

First, since the content C is bound to a user device, sharing the content in two or more user devices belonging to the same user is inconvenient. All these devices, that is, even devices belonging to the same user, must receive newly issued licenses based on their respective unique information. For example, when the device DB tries to reproduce the content received from the device DA, operations for transmitting unique information Xb' of the device DB, generating content Kc', generating common key Ks', and generating license L_B for the device DB must all be performed again.

Secondly, unique information of a user device is exposed to external devices.

Since most of the unique information Xa', Xb', ..., of user devices play important roles in the security aspect, it is preferable to avoid leakage of this information.

Thirdly, sharing content between user devices should be performed through the home server HS.

Generally, since authorization of use of the content C relies, in most cases, on a fee payment by a user and one user wants to use freely content in two or more user devices belonging to the domain of the user, the drawbacks described above become more serious obstacles to the development of home networks, the demand for which is currently increasing.

SUMMARY OF THE INVENTION

The present invention provides a method for transmitting content in a home network by binding the content to each user instead of to each device so that the content can be safely and conveniently shared.

According to an aspect of the present invention, there is provided a method for transmitting content to a user device from a home server in a home network, the method including: the home server receiving an allocated user public key and user private key of the user to whom the home server belongs; generating an arbitrary session public key and session private key, generating an encrypted session private key by encrypting the session private key using a device public key that is a public key of the user device, and transmitting the encrypted session private key that is generated to the user device; and transmitting content that is encrypted using a predetermined content key and content key encrypted using the session private key to the user device. The session public key and session private key may be updated whenever the user device joins or a change in registration of the user device with the home network occurs.

According to another aspect of the present invention, there is provided a method for transmitting content from a second user device to a first user device in a home network, the method including: the second user device receiving a user public key of a second user to whom the second user device belongs; generating a device certificate value by using a predetermined device value and the public key of the second user, and then transmitting the device certificate value to the home server of the first user device by using the device certificate value and the user private key of the first user to whom the first user device belongs, and determining whether or not the first user and the second user are identical based on the server certificate value generated by the home server and the device value; and receiving content encrypted by using a predetermined content key, and a content key encrypted by using a predetermined session public key, the content and content key being transmitted by the second user device if the first user and the second user are determined to be identical, wherein, the session private key corresponding to the session public key is transmitted to the user device by using a pair of the public key and private key of the user device if registration of the user device with the home network changes.

The device certificate value may be generated by the following equation:

$$C\_A = m^{Kpub\_u1'}$$

where C_A is the device certificate value, m is a device value, and Kpub_u1' is a user public key transmitted by the second user device.

The server certificate value may be generated by the following equation:

$$C\_A' = C\_A^{Kpri\_u1}$$

where C_A' is the server certificate value, and Kpri_u1 is the user public key of the first user.

The determination of whether or not the first user and the second user are identical may be performed by examining whether or not the server certificate value C_A' is the same as the device value m.

The device certificate value may be generated by the following equation:

$$C\_A = m * r^{Kpub\_u1}$$

where C_A is the device certificate value, m is a device value, Kpri_u1' is the user public key transmitted by the second device, and r is an arbitrary random number.

The server certificate value may be generated by the following equation:

$$C\_A' = C\_A^{Kpri\_u1}$$

where C_A' is the server certificate value, and Kpri_u1 is the user public key of the first user.

The determining whether the first user and the second user are identical may comprise determining whether a value that is obtained by dividing the server certificate value C_A' by arbitrary random number r is the same as device value m.

The method may further include determining whether a session private key of the first device is identical to a session private key of the second user device by using an electronic signature if the first user and the second user are determined to be identical.

The determining of whether the session private key of the first user device is identical to the session private key of the second user device may include: the first user device generating a first electronic signature value by encrypting an arbitrary first random number with using the session private key of the first user device; the first user device transmitting the first electronic signature value and the first random number to the second user device; and the second user device decoding the first signature value by using the session public key of the second user device, and determining whether or not a result value that is generated by decoding the first electronic signature is identical to the first random number.

The determining of whether the session private key of the first user device is identical to the session private key of the second user device may further include: the second user device generating a second electronic signature value by encrypting an arbitrary second random number with using the session private key of the second user device; the second user device transmitting the second electronic signature value and the second random number to the first user device; and the first user device decoding the second signature value by using the session public key of the first user device, and determining whether a result value that is generated by decoding the second electronic signature is identical to the second random number.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Aspects of the present invention will now be described more fully with reference to the accompanying drawings, in which exemplary embodiments of the invention are shown.

Figure 3:
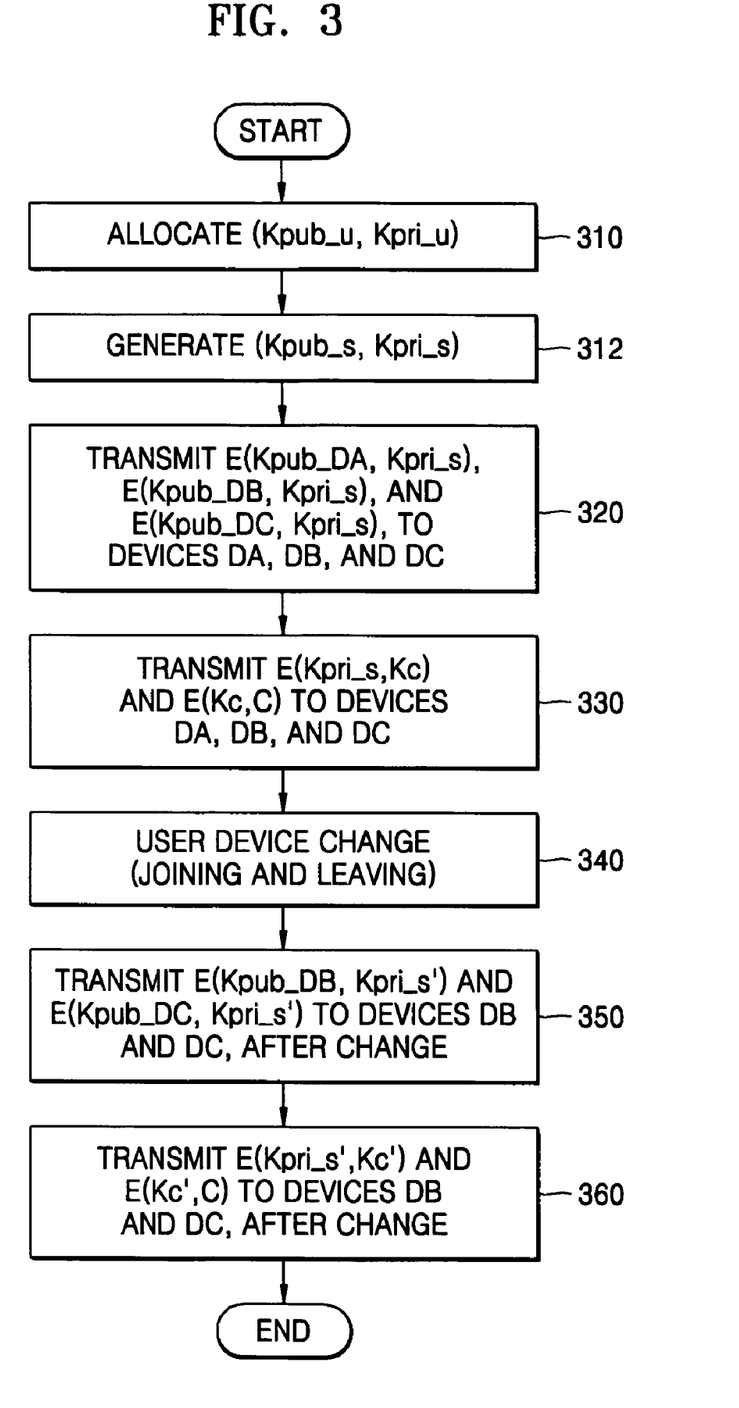
FIG. 3 is a flowchart of the operations performed by a method for transmitting content from a home server to a user device according to an exemplary embodiment of the present invention.

Referring to FIG. 3, it is assumed that at present user devices DA, DB, and DC are connected to a home server HS, a home network HN is formed with the home server HS and user devices DA, DB, and DC which belong to user U.

In operation 310, the home server HS receives a user common key Kpub_u and a user private key Kpri_u that are allocated to the user U to whom the home server HS belongs. According to the characteristics of a common key structure, the user common key Kpub_u is public and the user private key Kpri_u is owned only by the home server HS.

In operation 312, the home server HS generates a pair of arbitrary session keys (Kpub_s, Kpri_s), that is, a session common key Kpub_s and a session private key Kpri_s. Likewise, according to the characteristics of a common key structure, a common key Kpub_s is public and private key Kpri_s can be obtained only by user devices connected to the current home server HS, that is, user devices belonging to the domain of the home server HS.

In operation 320, the home server HS encrypts the session private key Kpri_s by using device common keys Kpub_DA, Kpub_DB, and Kpub_DC to generate encrypted session private keys E(Kpub_DA, Kpri_s), E(Kpub_DB, Kpri_s), and E(Kpub_DC, Kpri_s) and the home server HS then transmits the encrypted session private keys E(Kpub_DA, Kpri_s), E(Kpub_DB, Kpri_s), and E(Kpub_DC, Kpri_s) to the user devices DA, DB, and DC, respectively.

In operation 330, in response to requests of the user devices DA, DB, and DC, the home server HS transmits the encrypted content E(Kc, C) and the encrypted content key E(Kpri_s, Kc) to the user devices DA, DB, and DC. Here, Kc indicates the content key.

In operation 340, a change in user devices occurs. For example, the user device DA may leave the home network HN. Selling a user device to another user can be an example of this change of user devices.

In operation 350, the home server HS generates a pair of new session keys (Kpub_s', Kpri_s') and then, transmits the new session private key Kpri_s' in an encrypted state to user devices that belongs to home network HN after the change, that is, the user devices DB and DC.

That is, by encrypting the new session private key Kpri_s' by using the device common keys Kpub_DB and Kpub_DC, the home server HS generates encrypted session private keys E(Kpub_DB, Kpri_s') and E(Kpub_DC, Kpri_s'), and transmits the encrypted session private keys to the user devices DB and DC, respectively.

In operation 360, in response to requests from the user devices DB and DC, the home server HS transmits the encrypted content E(Kc', C) and the encrypted content key E(Kpri_s, Kc') to the user devices DB and DC. Here, Kc' indicates the new content key.

According to the method of FIG. 3, all of the user devices DA, DB, and DC belonging to the user U can obtain the session private key Kpri_s before the user device DA leaves the home network, and therefore can reproduce the content C. Accordingly, the inconvenience of requiring each user device to separately obtain an individual license can be reduced.

Also, since a user device does not need to transmit unique information to the home server, unnecessary leakage of unique information can be prevented.

Figure 4:
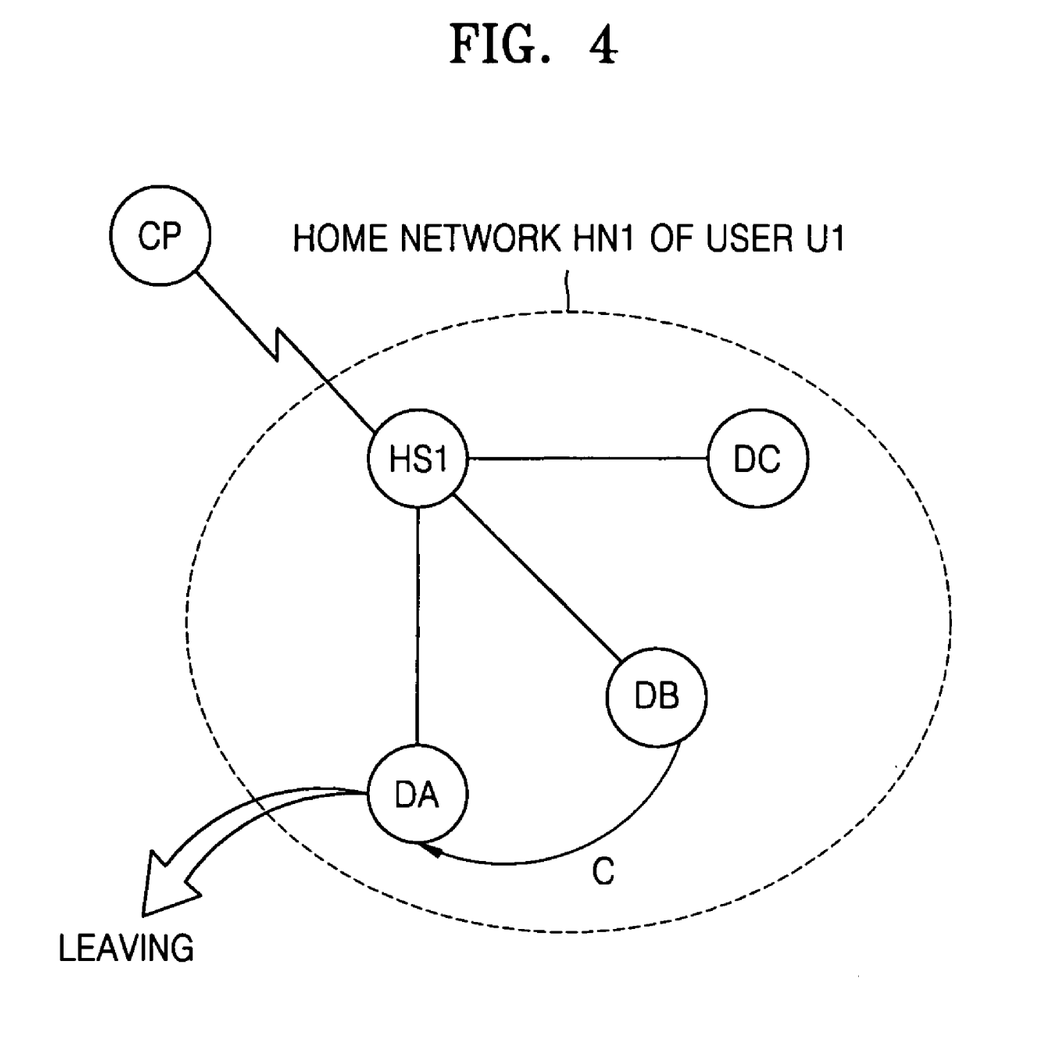
FIG. 4 illustrates an example of a home network according to an exemplary embodiment of the present invention.

FIG. 4 illustrates an example of a home network according to an exemplary embodiment of the present invention.

In FIG. 4, it is assumed that at present user devices DA, DB, and DC are connected to a home server HS1, and a home network HN is formed with the home server HS1 and the user devices DA, DB, and DC, which belong to the user U. At this time, the user device DA is going to leave the home network HN.

According to the method for transmitting content of FIG. 3, after the user device DA leaves the home network HN, a pair of session keys (Kpub_s, Kpri_s) is updated with a new pair of session keys (Kpub_s', Kpri_s) such that after leaving, the user device DA cannot reproduce content transmitted to the user devices DB and DC after the user device DA leaves. However, since the user device DA still has session private key Kpri_s, if an encrypted content E(Kc, C) and an encrypted content key E(Kpri_s, Kc) transmitted by the user device DB are received, the user device DA can obtain and reproduce the content C, that is, the content that was transmitted to the user device DA before the user device DA left the home network HN.

Due to digital content policies, a case where content transmitted by the user device DB and received by the user device DA before the user device DA left the home network and then reproducing the content by the user device DA after the user device DA has left the home network should be prevented. For example, the user device DA may register in a home network HN2 of another user U2. In this case, the use of the content C of user U by the user U2 should be prevented. A method for transmitting content between user devices of FIG. 5 should be suggested in this case.

Figure 5:
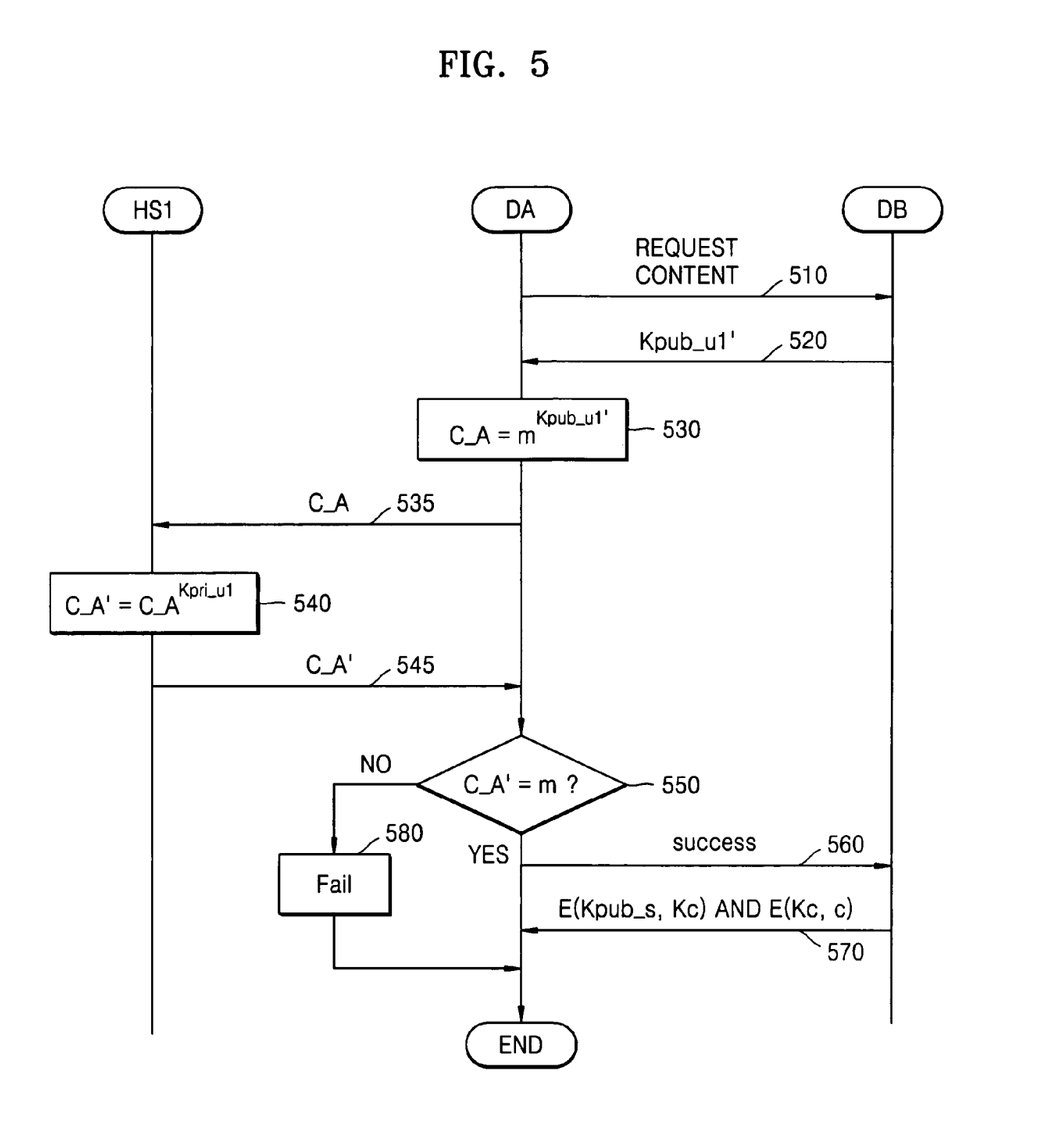
FIG. 5 illustrates a method for transmitting content between user devices according to an exemplary embodiment of the present invention.

FIG. 5 illustrates a method for transmitting content between user devices according to an exemplary embodiment of the present invention.

It is assumed that at present a home server HS1 and user devices DA, DB, and DC belong to a home network HN1 of user U1, and a home server HS2 and user devices DD, and DE belong to a home network HN2 of user U2.

In operation 510, the user device DA requests the user device DB to send content C.

In operation 520, the user device DB transmits a user common key Kpub_u1' of the user to whom the user device DB belongs to the user device DA.

In operations 530 and 535, the user device DA generates a device certificate value C_A by using a predetermined device value m and the user common key Kpub_u1' received in operation 520, and then, the user device DA transmits the certificate value C_A to the home server HS1 to which the user device DA belongs. The device certificate value C_A is generated, for example, as in the following Equation 1:

$$C\_A = m^{Kpub\_u1'} \qquad \text{(Equation 1)}$$

In operations 540 and 545, the home server HS1 generates a server certificate value C_A' by using the device certificate value C_A received in operation 535 and the user private key Kpri_u1 of the user U1 to whom the home server HS1 belongs, and then transmits the server certificate value C_A' to the user device DA. The server certificate value C_A' is generated, for example, as in following Equation 2:

$$C\_A' = C\_A^{Kpri\_u1} \qquad \text{(Equation 2)}$$

In operation 550, based on the device certificate value C_A and the device value m, the user device DA examines whether or not the user U1 of the user device DA is the same as the user of the user device DB. If the users are identical, operation 560 is performed and if not, operation 580 is performed.

When the device certificate value C_A and the server certificate value C_A' are defined as in Equation 1 and Equation 2, if the user of the user device DB is U1 (i.e., the user common key Kpub_u1' transmitted in operation 520 of the user (not confirmed) to whom the user device DB belongs is the user common key Kpub_u1 of the user U1) the server certificate value C_A' and device value m are identical as shown in the following Equation 3:

$$C\_A' = C\_A^{Kpri\_u1} \quad \text{(Equation 3)}$$
$$= \left(m^{Kpub\_u1'}\right)^{Kpri\_u1}$$
$$= m^{Kpub\_u1' * Kpri\_u1}$$
$$= m^{Kpub\_u1' * Kpri\_u1}$$
$$= m$$

In operation 560, the user device DA transmits a success message (SUCCESS) to the user device DB.

In operation 570, if the user device DB receives the success message (SUCCESS), the user device DB transmits the encrypted content key E(Kpub_s, Kc) and the encrypted content E(Kc, C) to the user device DA.

In operation 580, since the user of user device DA is not the same as the user of the user device DB, the user device DA determines that content C cannot be received by transmission and stops the process.

In the above exemplary embodiment, since the user device DA receives the server certificate value C_A', including information on the user, from the home server HS1, the user device DA cannot pretend that the user to whom the user device DA belongs to is another user. That is, if the user device DA comes to belong to a home network of another user U2, the user device DA will receive a server certificate value from the home server HS2 and therefore, Equation 3 is not satisfied.

Accordingly, only when the user of user device DB is the same as the user of the user device DA, the user device DA can transmit a success message (SUCCESS) to the user device DB. That is, only when the user device DA proves that the user of the user device DB is the same as the user of the user device DA, user device DA can receive content transmitted by the user device DB.

Figure 6:
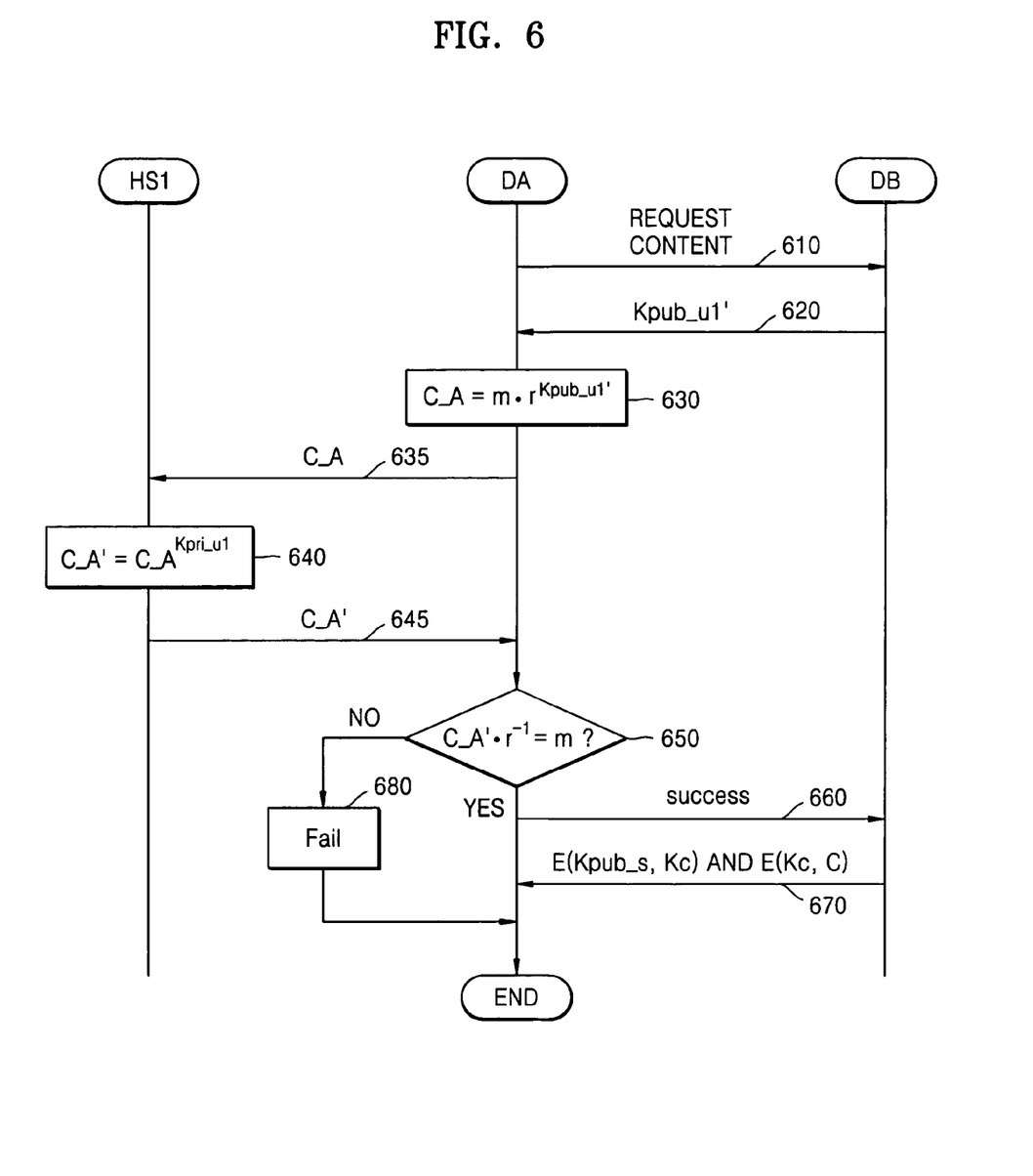
FIG. 6 illustrates a method for transmitting content between user devices according to another exemplary embodiment of the present invention.

FIG. 6 illustrates a method for transmitting content between user devices according to another exemplary embodiment of the present invention.

As in FIG. 5, it is assumed that a home server HS1 and user devices DA, DB, and DC belong to a home network HN1 of a user U1, and a home server HS2 and user devices DD, and DE belong to a home network HN2 of user U2.

In operation 610, the user device DA requests the user device DB to send content C.

In operation 620, user device DB transmits a user common key Kpub_u1' of the user to whom the user device DB belongs to the user device DA.

In operations 630 and 635, the user device DA generates a certificate value C_A by using an arbitrary random number r, a predetermined device value m and the user common key Kpub_u1' that is received in operation 620, and then, transmits the certificate value C_A to the home server HS1 to which the user device DA belongs. The device certificate value C_A is generated, for example, as in the following Equation 4:

$$C\_A = m * r^{Kpub\_u1'} \quad \text{(Equation 4)}$$

In operations 640 and 645, the home server HS1 generates a server certificate value C_A' by using the device certificate value C_A received in operation 635 and the user private key Kpri_u1 of user U1 to whom the home server HS1 belongs, and then transmits the server certificate value C_A to the user device DA. The server certificate value C_A' is generated, for example, as in the following Equation 5:

$$C\_A' = C\_A^{Kpri\_u1} \quad \text{(Equation 5)}$$

In operation 650, based on the arbitrary random number r, the device certificate value C_A and the device value m used in operation 630, the user device DA examines whether or not the user U1 of the user device DA is the same as the user of the user device DB. If the users are identical, operation 660 is performed. However, if the users are not identical, operation 680 is performed.

When the device certificate value C_A and the server certificate value C_A' are defined as in Equation 4 and Equation 5, if the user of the user device DB is U1 (i.e., the user common key Kpub_u1' transmitted in operation 620, of the user (not confirmed) to whom the user device DB belongs is the user common key Kpub_u1 of the user U1) then C_A'r−1 obtained by dividing the server certificate value C_A' by the random number r is the same as the device value m. This is shown in the following Equation 6:

$$C\_A' * r^{-1} = C\_A^{Kpri\_u1} * r^{-1} \quad \text{(Equation 6)}$$
$$= \left(m * r^{Kpub\_u1'}\right)^{Kpri\_u1} * r^{-1}$$
$$= m^{Kpri\_u1} * r^{Kpub\_u1' * Kpri\_u1} * r^{-1}$$
$$= m^{Kpri\_u1} * r^{Kpub\_u1' * Kpri\_u1} * r^{-1}$$
$$= m * r * r^{-1}$$
$$= m$$

In operation 660, the user device DA transmits a success message (SUCCESS) to the user device DB.

In operation 670, if the user device DB receives the success message (SUCCESS), the user device DB transmits the encrypted content key E(Kpub_s, Kc) and the encrypted content E(Kc, C) to the user device DA.

In operation 680, since the user of the user device DA is not the same as the user of the user device DB, the user device DA determines that content C cannot be received by transmission and the process is stopped.

As in FIG. 5, since the user device DA receives the server certificate value C_A' including information on the user from the home server HS1, the user device DA cannot pretend that the user to whom the user device DA belongs to is another user. That is, if the user device DA comes to belong to a home network of another user U2, the user device DA will receive a server certificate value from the home server HS2 and therefore, Equation 6 is satisfied. Accordingly, only when the user of the user device DB is the same as the user of the user device DA can the user device DA transmit a success message (SUCCESS) to the user device DB. That is, only when the user device DA proves that the user of the user device DB is the same as the user of the user device DA can the user device DA receive content transmitted by the user device DB.

In the exemplary embodiments of FIGS. 5 and 6, it is possible to define a device value m as m=h(Xa), obtained by hashing unique information Xa of the user device DA.

Since the unique information Xa is hashed and then transmitted to the home server HS1, the unique information Xa is not exposed to the outside.

Figure 7:
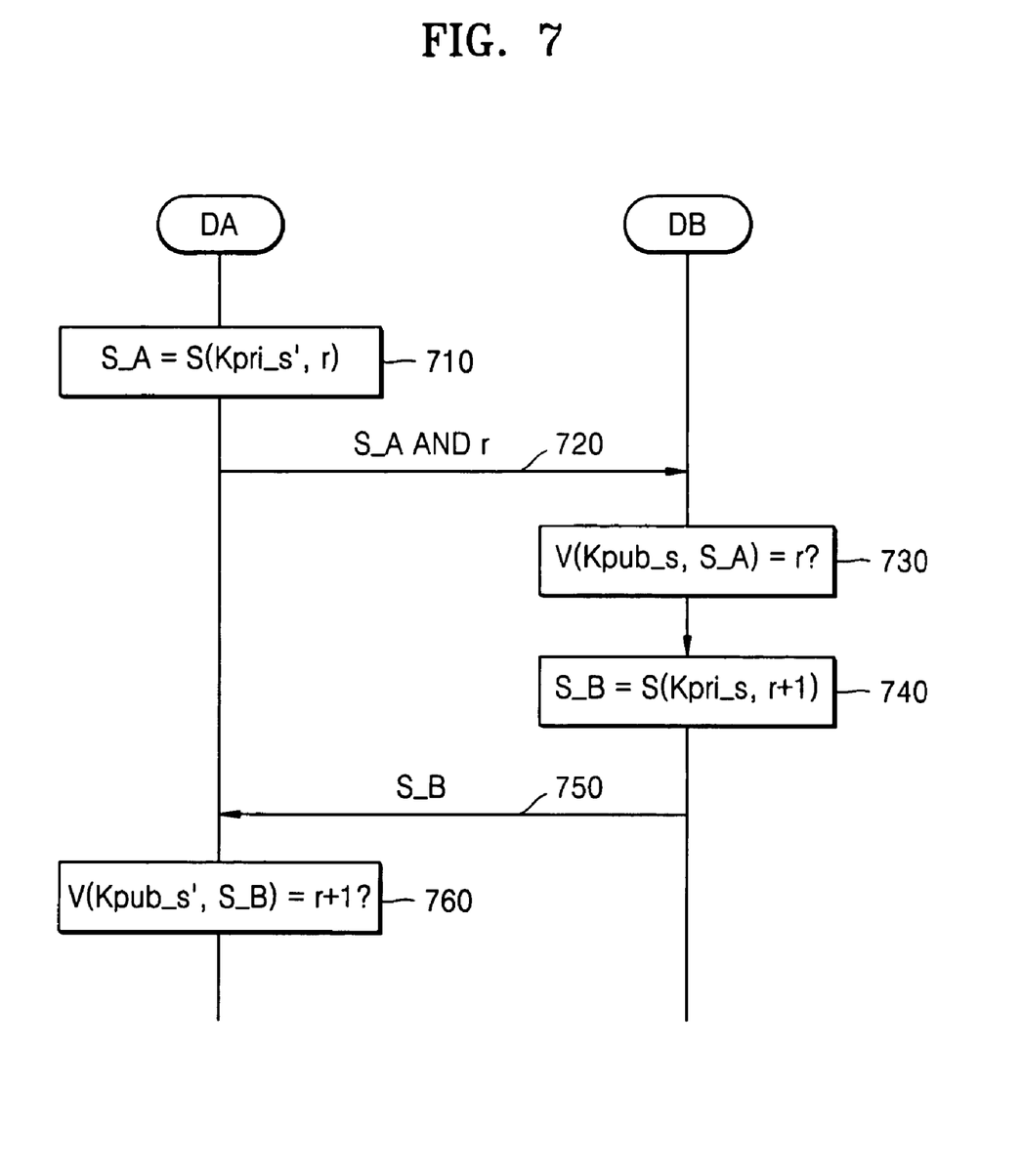
FIG. 7 illustrates a process for examining whether or not session keys are identical when session keys are updated, in the content transmission method of FIG. 5.

FIG. 7 illustrates a process for examining whether session keys are identical when session keys are updated, in the content transmission method of FIG. 5.

Even when the user devices DA and DB belong to the same user U1, if the time when the user device DA joins the home network HN1 is different from the time when user device DB joins the home network HN1, the session key Kpri_s held by the user device DB is different from the session key Kpri_s' held by the user device DA. For example, there can be a case where the user devices DB and DC are in the home network HN1 before time t1, and the user device DB joins the home network HN1 at time t1.

Since a session key used for encrypting a content key is updated if there is a change in elements of a home network, even though the user device DA receives the encrypted content key E(Kpub_s, Kc) transmitted by the user device DB, newly joined user device DA does not have the session key Kpri_s (i.e., the session key before joining the home network) and therefore user device DA cannot obtain content key Kc. Accordingly, when content is transmitted between the user devices DA and DB, a process for examining whether or not versions of session keys are identical is additionally required.

Assuming that the situation is shown as in Table 1, a process for examining the version of a session key will now be explained. Here, the user device DA wants to receive content C from the user device DB.

TABLE 1

| | Before t1 | After t1 |
|---|---|---|
| User devices of HN1 | DB, DC | DA, DB, DC |
| Pair of session keys | Kpri_s, Kpub_s | Kpri_s', Kpub_s' |
| Encrypted content key | E(Kpub_s, Kc) | E(Kpub_s', Kc) |

In operation 710, the user device DA electronically signs using an electronic signature function S( ) with a first random number r, which is an arbitrary random number, and the session private key Kpri_s'. That is, the user device DA generates the electronic signature value S_A=S(Kpri_s', r) by encrypting the first random number r using the session private key Kpri_s' held by the user device DA.

In operation 720, the user device DA transmits the electronic signature value S_A generated in operation 710 and the first random number r to the user device DB.

In operation 730, the user device DB verifies the electronic signature value S_A that is transmitted in operation 720, by using a verification function V( ). That is, the user device DB decodes the electronic signature value S_A transmitted in operation 720 by using the session common key Kpub_s held by the user device DB, and examines whether or not the generated result value, V(Kpub_s, S_A) is the same as the first random number r transmitted in operation 720.

If the session private key Kpri_s' used for electronically signing by the user device DA is the same as the session private key Kpri_s paired with the session public key Kpub_s held by the user device DB, result value V(Kpub_s, S_A) is the same as first random number r. Thus, the version of a session key pair held by the user device DA is the same as that of a session key pair held by the user device DB.

In operation 740, the user device DB electronically signs by using electronic signature function S( ) with a second random number related to the first random number r in operation 730, for example, r+1, and session private key Kpri_s. That is, the user device DB generates an electronic signature value S_B=S(Kpri_s, r+1) by encrypting the related random number (r+1) with the session private key Kpri_s, which is held by the user device DB.

In operation 750, the user device DB transmits the electronic signature value S_B generated in operation 740 and the related random number (r+1) to the user device DA.

In operation 760, the user device DA verifies the electronic signature value S_B transmitted in operation 750 by using the verification function V( ). That is, the user device DA decodes the electronic signature value S_B transmitted in operation 750 by using the session public key Kpub_s' held by user device DA, and examines whether or not the generated result value V(Kpub_s', S_B) is the same as the second random number (r+1) that is obtained by adding 1 to the first random number in operation 710.

In the same manner as in operations 710 through 730, if the session private key Kpri_s used for electronically signing by the user device DB is the same as the session private key Kpri_s' that is paired with the session public key Kpub_s' held by the user device DA, the result value V(Kpub_s', S_B) is the same as the second random number (r+1). This means that the version of the session key pair held by user device DB is the same as that of session key pair held by the user device DA.

The process for examining the version of session keys in operations 710 through 760 is added between operations 660 and 670 in FIG. 5. That is, the process for examining whether or not the versions of session key pairs of the user devices DA and DB are identical is added after the process for confirming whether or not the user devices DA and DB belong to an identical user.

Meanwhile, the method for transmitting content according to an exemplary embodiment of the present invention described above can be implemented as a computer program. Codes and code segments forming the program can be easily inferred by the programmers in the technology field of the present invention. Also, the program is stored in computer readable media, and read and executed by a computer to implement the filtering method. The computer readable media includes magnetic recording media, optical recording media and carrier wave media.

While aspects of the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

According to aspects of the present invention as described above, in a home network, by binding content to each user with using a common key structure, not to each device, the content can be safely and conveniently shared.

What is claimed is:

1. A method of transmitting content to a user device from a home server in a home network, the method comprising:
    transmitting the content, which is encrypted by using a predetermined content key, and transmitting the predetermined content key, which is encrypted by using a pair of a predetermined session public key and a session private key, to the user device,
    wherein the content that is transmitted is bound to a user by allowing transmission of the content from the user device to a first user device only if it is determined that the first user device belongs to the user by using a user public key and a user private key of the user to whom the home server belongs,
    wherein the user public key and the user private key are used to determine whether users of a plurality of user devices in the home network are identical,
    wherein the session public key and the session private key, used by the plurality of user devices in the home network, are updated if the user device leaves the home network.

2. The method of claim 1, wherein the transmitting comprises:
    receiving the user public key and the user private key, which are allocated, of the user to whom the home server belongs;

generating the session public key and the session private key, generating an encrypted session private key by encrypting the session private key using a device public key, which is a public key of the user device, and transmitting the encrypted session private key to the user device; and transmitting, to the user device, the content, which is encrypted by using the predetermined content key, and the predetermined content key, which is encrypted by using the session private key.

3. The method of claim 2, wherein the user device obtains the session private key by decoding the encrypted session private key using a device private key and the user device obtains the predetermined content key by decoding the encrypted content key using the session private key.

4. The method of claim 1, wherein the public session key and the private session key are generated by the home server.

5. The method of claim 1, wherein the home server receives the user public key and the user private key.

6. A method of transmitting content from a second user device to a first user device in a home network, the method comprising:

determining whether a user of the first user device is identical to a user of the second user device based on pairs of user public keys and user private keys of the first user device and the second user device, and transmitting the content from the second user device to the first user device only if the user of the first user device and the user of the second user device are determined to be identical, wherein the content is bound to a user by a user public key and a user private key of the user to whom each of the user devices belongs.

7. The method of claim 6, wherein the determining comprises:

receiving, from the second user device, a user public key of a second user to whom the second user device belongs;

generating a device certificate value by using a predetermined device value and the public key of the second user, and transmitting the device certificate value that is generated to a home server of the first user device;

determining whether the first user and the second user are identical based on a server certificate value that is generated by the home server by using the device certificate value and the user private key of the first user to whom the first user device belongs and the predetermined device value; and receiving the content that is encrypted by using a predetermined content key, and a content key that is encrypted by using a predetermined session public key, wherein the content and the content key are transmitted by the second user device if the first user and the second user are determined to be identical, wherein the session private key that corresponds to the session public key is transmitted to the user device by using a pair of the public key and private key of the user device if registration of the user device with the home network changes.

8. The method of claim 7, wherein the device certificate value (C_A) is generated using the following equation:

$$C\_A = mKpub\_u1'$$

where m is a device value, and Kpub_u1' is a user public key that is transmitted by the second user device.

9. The method of claim 8, wherein the server certificate value (C_A') is generated using the following equation:

$$C\_A' = C\_AKpri\_u1$$

where Kpri_u1 is the user private key of the first user.

10. The method of claim 9, wherein the determining whether or not the first user and the second user are identical comprises determining whether the server certificate value (C_A') is the same as the device value (m).

11. The method of claim 6, wherein the device certificate value (C_A) is generated using the following equation:

$$C\_A = m*rKpub\_u1'$$

where m is a device value, Kpub_u1' is the user public key transmitted by the second device, and r is an arbitrary random number.

12. The method of claim 11, wherein the server certificate value (C_A') is generated using the following equation:

$$C\_A' = C\_AKpri\_u1$$

where Kpri_u1 is the user public key of the first user.

13. The method of claim 12, wherein the determining whether the first user and the second user are identical comprises determining whether a value that is obtained by dividing the server certificate value (CA') by an arbitrary random number (r) is the same as the device value (m).

14. The method of claim 7, further comprising:

determining the content from the second user device cannot be received and stopping transmission of content if the users are determined not to be identical.

15. The method of claim 7, further comprising:

determining whether a session private key of the first user device is identical to a session private key of the second user device by using an electronic signature if the users are determined to be identical.

16. The method of claim 15, wherein the determining whether the session private key of the first user device is identical to the session private key of the second user device comprises:

generating, at the first user device, a first electronic signature value by encrypting an arbitrary first random number using the session private key of the first user device;

transmitting, from the first user device, the first electronic signature value and the first random number to the second user device; and decoding, at the second user device, the first electronic signature value by using the session public key of the second user device, and determining whether a result value that is generated by decoding the first electronic signature value is identical to the first random number.

17. The method of claim 16, wherein the determining whether the session private key of the first user device is identical to the session private key of the second user device further comprises:

generating, at the second user device, a second electronic signature value by encrypting an arbitrary second random number using the session private key of the second user device;

transmitting, from the second user device, the second electronic signature value and the second random number to the first user device; and decoding, at the first user device, the second electronic signature value by using the session public key of the first user device, and determining whether a result value that is generated by decoding the second electronic signature is identical to the second random number.

18. The method of claim 17, wherein the first random number and the second random number are related to each other.

19. The method of claim 6, wherein a home server of the home network determines whether the user of the first user device is identical to a user of the second user device.

20. A non-transitory computer readable storage medium having embodied thereon a computer program for executing a method of transmitting content to a user device from a home server in a home network, the method comprising:
- transmitting the content, which is encrypted by using a predetermined content key, and transmitting the predetermined content key, which is encrypted by using a pair of a predetermined session public key and a session private key, to the user device,
- wherein the content that is transmitted, is bound to a user by allowing transmission of the content from the user device to a first user device only if it is determined that the first user device belongs to the user by using a user public key and a user private key of the user to whom the home server belongs,
- wherein the user public key and the user private key are used to determine whether users of a plurality of user devices in the home network are identical,
- wherein the session public key and the session private key, used by a plurality of user devices in the home network, are updated if the user device leaves the home network.

21. The computer readable storage medium of claim 20, wherein the public session key and the private session key are generated by the home server.

22. The computer readable storage medium of claim 20, wherein the home server receives the user public key and the user private key.

23. A non-transitory computer readable storage medium having embodied thereon a computer program for executing a method of transmitting content from a second user device to a first user device in a home network, the method comprising:
- determining whether a user of the first user device is identical to a user of the second device based on pairs of user public keys and user private keys of the first user device and the second user device, and transmitting the content from the second user device to the first user device only if the users of the first device and the second device are determined to be identical, wherein the content is bound to a user by a user public key and a user private key of the user to whom each of the user devices belongs, wherein the determining comprises:
- receiving, from the second user device, a user public key of a second user to whom the second user device belongs;
- generating a device certificate value by using a predetermined device value and the public key of the second user, and transmitting the device certificate value that is generated to the home server of the first user device;
- determining whether the first user and the second user are identical based on the server certificate value that is generated by the home server by using the device certificate value and the user private key of the first user to whom the first user device belongs and the predetermined device value; and
- receiving the content that is encrypted by using a predetermined content key, and a content key that is encrypted by using a predetermined session public key, wherein the content and the content key are transmitted by the second user device if the first user and the second user are determined to be identical,
- wherein the session private key that corresponds to the session public key is transmitted to the user device by using a pair of the public key and private key of the user device if registration of the user device with the home network changes.

* * * * *